(12) United States Patent
Gui et al.

(10) Patent No.: US 9,401,773 B1
(45) Date of Patent: Jul. 26, 2016

(54) COMPACT MULTI-CHANNEL WDM DEVICES FOR HIGH-SPEED DATA COMMUNICATIONS

(71) Applicant: Alliance Fiber Optic Products, Inc., Sunnyvale, CA (US)

(72) Inventors: Dong Gui, Sunnyvale, CA (US); Andy Zhou, Fremont, CA (US); Yao Li, Newark, CA (US); Qijun Xiao, Fremont, CA (US); Xiaotao Peng, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 14/637,406

(22) Filed: Mar. 4, 2015

(51) Int. Cl.
*H04B 10/43* (2013.01)
*H04J 14/02* (2006.01)
*G02B 6/42* (2006.01)

(52) U.S. Cl.
CPC ..................... *H04J 14/02* (2013.01)

(58) Field of Classification Search
CPC ....... H04J 1/02; H04J 1/0215; H04J 14/0216; G02B 27/0025; G02B 27/1006; G02B 3/005; G02B 6/4215; H04B 10/43
USPC .......................................................... 398/82
See application file for complete search history.

(56) References Cited

U.S. PATENT DOCUMENTS

| | | | | |
|---|---|---|---|---|
| 7,212,343 B1 * | 5/2007 | He | ..................... | G02B 6/29365 359/618 |
| 7,843,644 B1 * | 11/2010 | Wang | ..................... | G02B 6/262 359/641 |
| 8,537,468 B1 * | 9/2013 | Wang | ................. | G02B 27/0025 359/619 |
| 2014/0248057 A1 * | 9/2014 | Li | ..................... | G02B 6/29365 398/82 |
| 2015/0229400 A1 * | 8/2015 | Oguma | .............. | G02B 6/12011 398/79 |

* cited by examiner

*Primary Examiner* — Dalzid Singh
(74) *Attorney, Agent, or Firm* — Joe Zheng (57) ABSTRACT

Techniques for designing compact free-space optical device with all input/output ports on one side are disclosed. Instead of folding a fiber, a beam folding means is provided to turn a light beam to significantly reduce the size of the device. In one embodiment, there are a first collimator, a second collimator, and a beam folding means to turn a light beam from the first collimator back to the second collimator by two turns so that a first light path from the first collimator to the beam folding means and a second light path from the second collimator to the beam folding means are parallel. A substrate is provided to which the first and second collimators and filters are boned thereto.

13 Claims, 8 Drawing Sheets

COMPACT MULTI-CHANNEL WDM DEVICES FOR HIGH-SPEED DATA COMMUNICATIONS

BACKGROUND OF THE INVENTION

1. Field of the Invention

The invention is generally related to the area of optical communications. In particular, the present invention is related to optical wavelength multiplexing or add/drop devices and the method for making the same in compact size, where the size of the device is small enough to fit in small form-factor optical modules, such as C Form-factor Hot Pluggable 4 (CFP4) and Quad Small Form-Factor Pluggable 28 (QSFP-28) for client-side data communication.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and perhaps more) separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multi-channel signal for dropping a wavelength while simultaneously adding a channel with a matching wavelength at the same network node. Likewise, for transmission through a single fiber, a plurality of channel signals are combined via a multiplexer to be a multiplexed signal that is eventually separated or demultiplexed via a demultiplexer.

Figure 1:
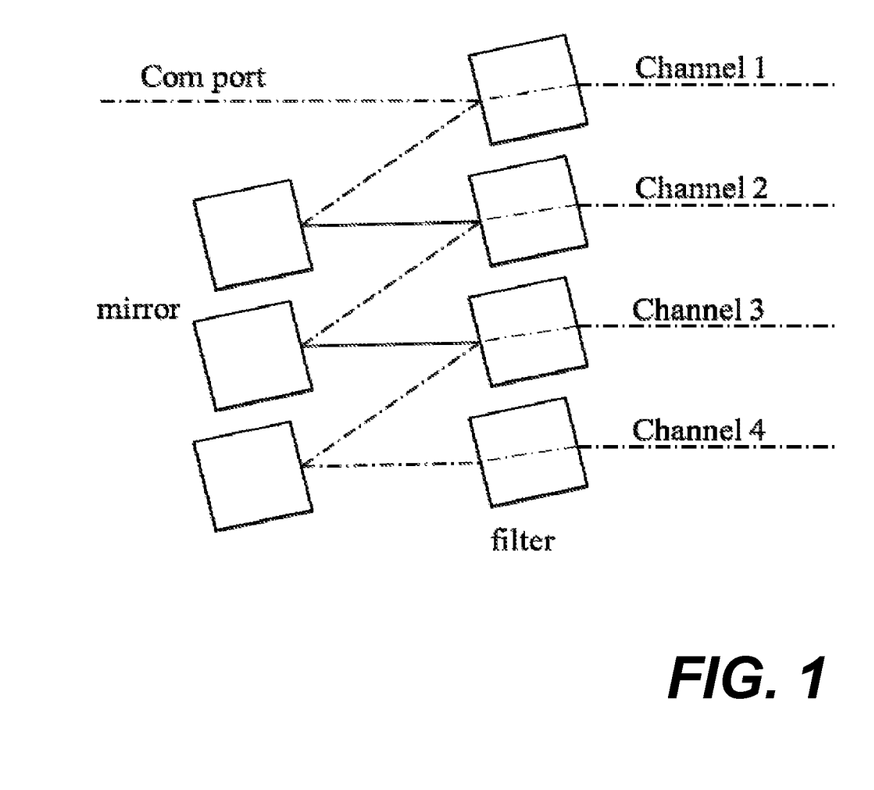
FIG. 1 (prior art) duplicates a figure from U.S. Pat. No. 5,583,683.
Figure 2:
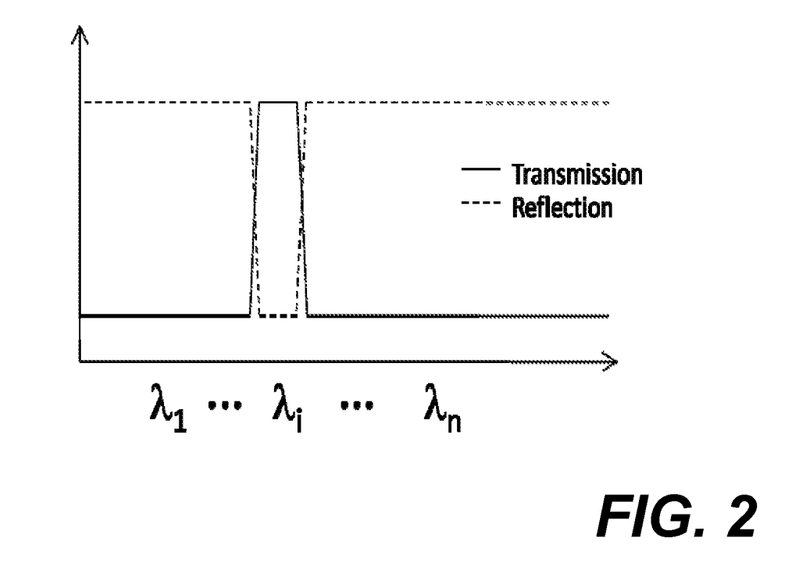
FIG. 2 shows a typical optical transmission and reflection spectra of a single-channel band-pass filter that transmits $\lambda_i$ and reflects wavelength from $\lambda_1$ to $\lambda_{i-1}$ and $\lambda_{i+1}$ to $\lambda_n$.

A typical prior art free-space WDM Demux, as disclosed in U.S. Pat. No. 8,537,468, is duplicated in FIG. 1. The device allows a multiple wavelength light traveling from a common port and to be separated into multiple narrow spectral bands respectively directed to individual channels. At each of the multiple channels, a dielectric thin film filter transmits a selected wavelength band to a designated channel port and reflect all other wavelengths. FIG. 2 shows a typical optical transmission and reflection spectra of a single-channel bandpass filter that transmits $\lambda_i$ and reflects wavelength from $\lambda_1$ to $\lambda_{i-1}$ and $\lambda_{i+1}$ to $\lambda_n$. The reflected wavelength signals continue propagating to next channel ports, where an in-band signal is transmitted out and the out-band signals are reflected and continue propagating along the optical path. After multiple bounces in a zig-zag fashion as shown in FIG. 1, multiple channel signals are dropped. The device can also be used as a multiplexer (Mux) with the common port outputting all wavelengths multiplexed or added from the individual channels. The design has a number of advantages including low back-reflection, low loss and high reliability.

At the moment, 40 Gb/s or 100 Gb/s is achieved by using 4-channel WDM Mux/Demux that is widely adopted commercially in the CFP4 and QSFP28 packaging. To meet the exploring data consumption requirement and achieve higher data transmission data of 800 Gb/s, it is practical to double the number of channels from 4 to 8 or more. However, this change does not simply mean doubling the size of current 4-channel WDM. The design is, as matter of fact, very challenging. The most important issue that needs to be resolved is how to fit all the 8 channels Mux/Demux into the form factor of CFP4 or QSFP4 which has a very limited space inside. The CFP4 form factor is a CFP Multi-Source Agreement (MSA) defining an optical transceiver in the CFP4 form factor to support 40 Gbit/s and 100 Gbit/s interfaces for Ethernet, telecommunication and other applications. QSFP stands for Quad Small Form-factor Pluggable (QSFP) and is a compact hot-pluggable transceiver compact used for data communications applications. It interfaces networking hardware to a fiber optic cable. It is an industry format jointly developed and supported by many network component vendors, allowing data rates from 4×10 Gbit/s. The format specification is evolving to enable higher data rates.

The present application discloses the designs of 8-channel WDM devices that can fit into the form factor of CFP4 or QSFP4

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to compact multi-channel WDM devices for high-speed data communications. According to one aspect of the present invention, optical parts (e.g., filters and reflectors) are fairly evenly distributed on one side or both sides of a substrate to reduce the physical size of the packaging thereof. A reflecting mechanism (e.g., a prism or mirrors) is used to ensure all output ports are on end of the substrate to fit retroactively the form factor in compliance with an industrial standard. Depending on implementation, the industrial standard is generally related to a transceiver in a form factor of QSFP, QSFP28, CXP, XFP, CFP, CFP-2, or CFP-4.

According to another aspect of the present invention, optical filters are used as reflectors as well. Instead of using a separate reflector to bounce a light beam between the optical filters, an optical filter designated to transmit a signal optical filters at a designated wavelength is used to reflect the light beam carrying other wavelengths onto another optical filter, resulting in more space saving in packing the device.

According to one embodiment, the present invention is a WDM optical device, it comprises a port, a substrate with a first side and a second side, an optical turning part disposed on one end of the substrate, a first set of optical filters and a second set of optical filters disposed substantially in parallel on the first side of the substrate, wherein a light beam carrying N signals respectively at wavelengths $\lambda_1, \lambda_2, \ldots \lambda_N$ from the port impinges upon a first one of the optical filters in the first set, N is at least 8, the first one of the optical filters in the first set transmits through a first signal at a first wavelength $\lambda_1$ and reflects the light beam carrying other wavelengths onto a first one of the second set of optical filters, the first one of the second set of optical filters transmits through a second signal at a second wavelength $\lambda_2$ and reflects the light beam carrying other wavelengths onto a second one of the first set of optical filter, and wherein the first signal is coupled out via a printed circuit board disposed on another end of the substrate, and the second signal is turned by the optical turning part to the second side of the substrate and coupled out via the printed circuit board. In general, the WDM optical device is packaged in a form factor in compliance with an industry standard.

According to another embodiment, the present invention is a WDM optical device, it comprises a common port, a substrate with an upper side and a lower side, eight ports disposed on one end of the substrate, an optical turning part disposed on another end of the substrate, four optical filters in a first set and four optical filters in a second set disposed on the upper side of the substrate, wherein a light beam carrying eight signals respectively at wavelengths $\lambda_1, \lambda_2, \ldots \lambda_8$ from the port impinges upon a first one of the four optical filters in the first set, the first one of the four optical filters in the first set transmits through a first signal at a first wavelength $\lambda_1$ and reflects the light beam carrying other wavelengths onto a first one of the four optical filters in the second set, the first one of the four optical filters in the second set transmits through a second signal at a second wavelength $\lambda_2$ and reflects the light beam carrying other wavelengths onto a second one of the four optical filters in the first set, and wherein the first signal is coupled out via one of the eight ports to a printed circuit board, and the second signal is turned by the optical turning part to the lower side of the substrate and coupled out via another one of the eight ports to the printed circuit board.

One of the objects, features, advantages of the present invention is to provide optical devices that are amenable to small footprint, broad operating wavelength range, enhanced impact performance, lower cost packaging, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 3:
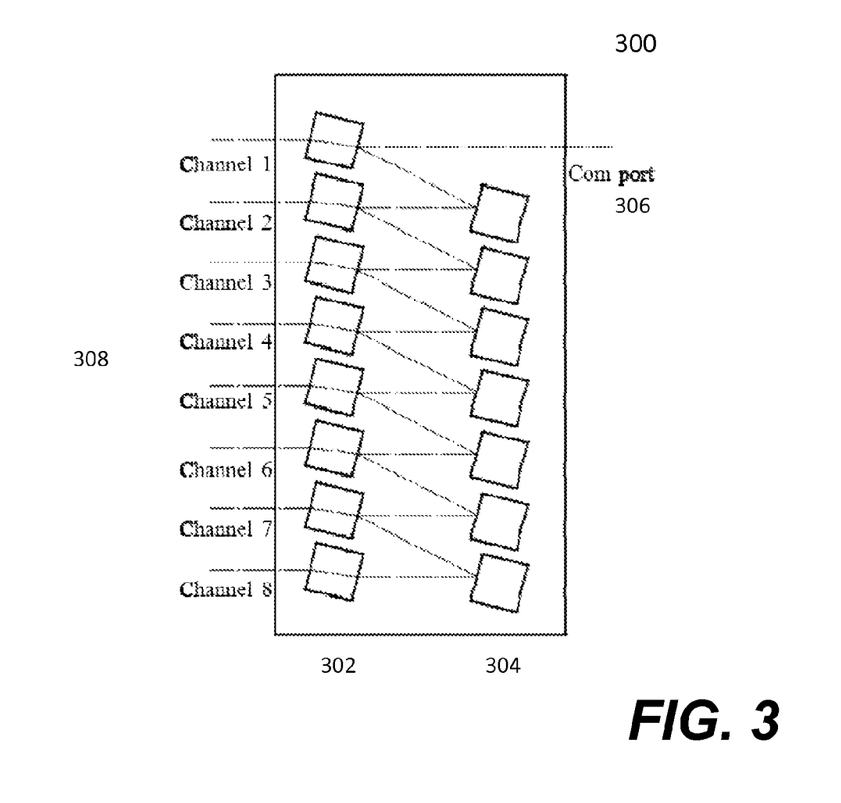
FIG. 3 shows an exemplary embodiment of a compact 8-channel WDM devices for high-speed data communications according to one embodiment of the present invention.

Referring now to the drawings, in which like numerals refer to like parts throughout the several views. FIG. 3 shows an exemplary embodiment 300 of a compact 8-channel WDM devices for high-speed data communications according to one embodiment of the present invention. As shown in FIG. 3, an 8-channel WDM device includes 8 filters 302 and 7 mirrors 304 with a com port 306 and Demux channels 308 placed on two opposite sides. In another embodiment, an prism or two mirrors (not shown) may be added in the Com port to fold the beam in the Com port by 180°, all the channels and the Com port can be placed on the same side, which facilitates efficiently packing. The laser beams travel in the zig-zag fashion between filter and prism before they leave the device.

For Transmitter Optical Sub-Assembly (TOSA) applications, beams from 8 lasers with one in each channel after multiple reflections, merge into one beam in the Com port. A fiber receptacle or collimator plus a converging lens can be placed in the Com port to collect the merged beams into a single fiber. For Receiver Optical Sub-Assembly (ROSA) application, a laser beam with multiple wavelengths enters the device in the Com port. The multiple wavelengths are separated in free-space into different channels with one wavelength in each channel. A converging lens and photodiode (PD) is placed in each channel to detect the light with specified wavelength and transform into electronic signal with amplification.

Figure 4:
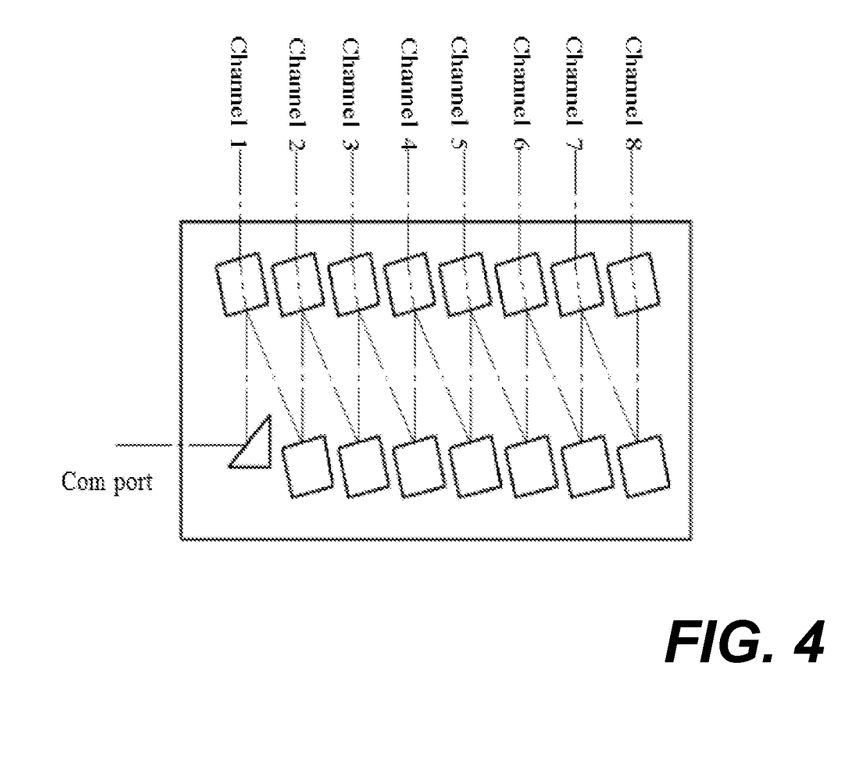
FIG. 4 shows another embodiment of the present invention in which a Mux/Demux device is rotated counterclockwise by 90° to fit a form factor.
Figure 5:
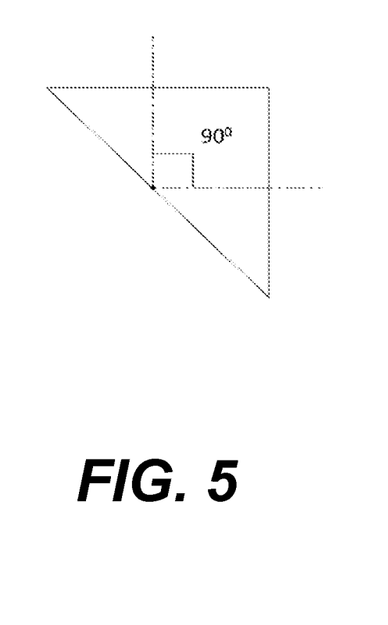
FIG. 5 shows a laser bending technique achieved by using internal reflection in a 45° prism.

In the 8-channel WDM device as shown in FIG. 3, the width of the device is about twice the one of the 4-channel WDM Mux/Demux device. As in the form factors like CFP4 and QSFP28, the width is very limited by the definition. Obviously it is very challenging to fit this design inside. To reduce the width of this design, it is natural to think to rotate this device. FIG. 4 shows another embodiment 400 of the present invention. In this design, the Mux/Demux device 400 is rotated counterclockwise by 90° to fit the form factor. A reflective mirror 402 is added in the Com port to bend the laser in the Com port. This laser bending can also be achieved by using internal reflection in a 450 prism as shown in FIG. 5. By using total internal reflection, the polarization loss of beam (PDL) is very small, 0.02 dB or even less. As shown in FIG. 4, the beams in the Com port and 8 channels are perpendicular to each other. In the transceiver application, it is often needed that input and output are in the same direction. So a prism or mirrors can be added to bend all the 8-channel beams counterclockwise or clockwise by 90°.

Figure 6:
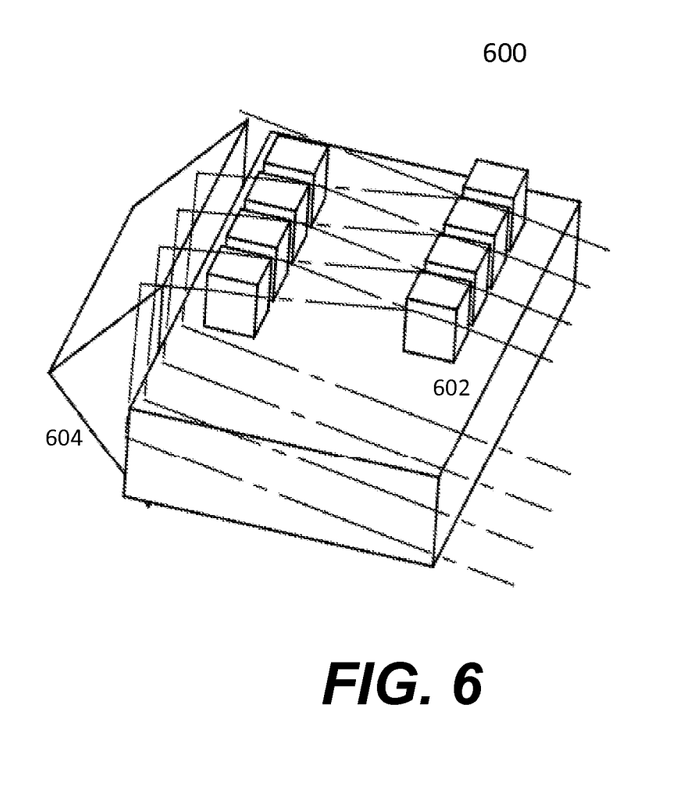
FIG. 6 shows a Mux/Demux with two layers to fully utilize the space on both sides of a substrate supporting the filters.

In the design of FIG. 4, the overall size of the device is not decreased, which may leave no space for a PCB (printed circuit board) to be placed in the form factor, where the PCB is provided to support circuitry, such as photodetectors or laser diodes. To further reduce its size, FIG. 6 shows a Mux/Demux 600 with two layers to fully utilize the space on both sides of a substrate 602 supporting the filters. A prism 604 is used to bend the reflected light beam to another layer. In reference to FIG. 7, a laser beam coming to the Com port 702 is directed onto a filter that outputs a channel signal $\lambda_1$, the filter reflects all others to a next filter. The next filter transmits a channel signal $\lambda_2$ that is impinged onto the prism 604 (not shown in FIG. 7). The prism 604 bends the channel signal $\lambda_2$ to output the same on the same side of outputting the channel signal $\lambda_1$. At the same time, the next filter reflects the rest of the laser beam to a next filter to produce a channel signal $\lambda_3$. The laser beams continues along the remaining filters. As a result, there are four channel signals $\lambda_1, \lambda_3, \lambda_5$ and $\lambda_7$ from the upper layer and four channel signals $\lambda_2, \lambda_4, \lambda_6$ and $\lambda_8$ from the lower layer.

Figure 7:
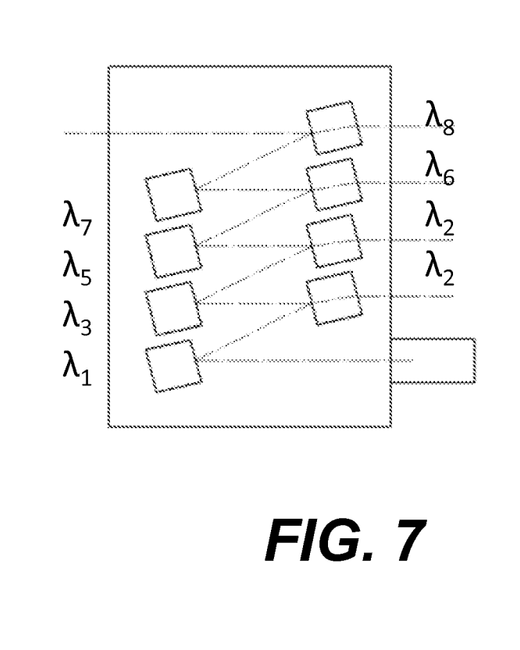
FIG. 7 shows a laser beam coming to a Com port is directed onto a filter that outputs a channel signal $\lambda_1$, the filter reflects all others to a next filter, the next filter transmits a channel signal $\lambda_2$ that is impinged onto a prism (not shown)
Figure 8:
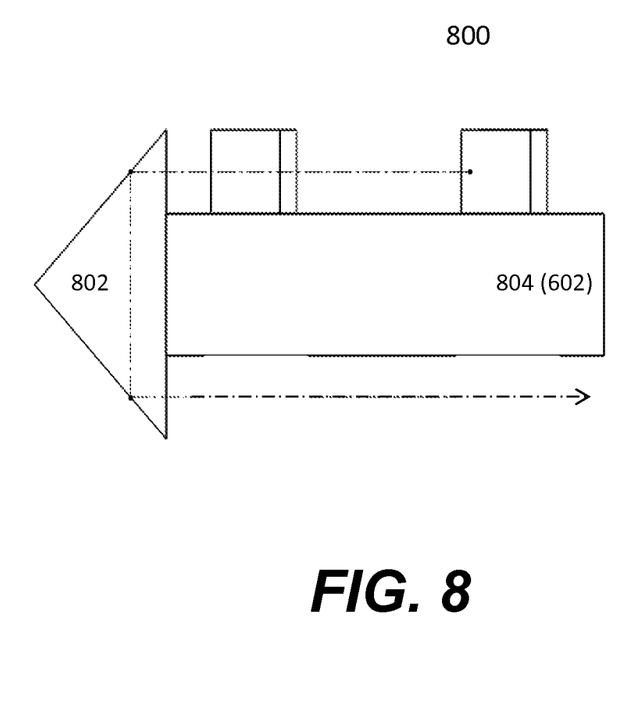
FIG. 8 shows a side view of the device of FIG. 6.

The width or length of this design shown in FIG. 6 or FIG. 7 is roughly cut by half compared to the one shown in FIG. 4 although the height is increased about 50%. A side view of the device 600 is shown in FIG. 8. A prism 802 is added on the side of the substrate 804 to fold the laser beam from a filter on a first layer onto a second layer after the laser beam goes through several times of zip-zig reflection and separated into 4 channels on the first layer. The beam folding is shown in the side view of FIG. 8. After reaching the second layer, the laser beam continues to follow the similar route of the first layer on the second layer and is separated into another 4 channels. The 4 channels in the first and second layers are located on two opposite sides.

Figure 9:
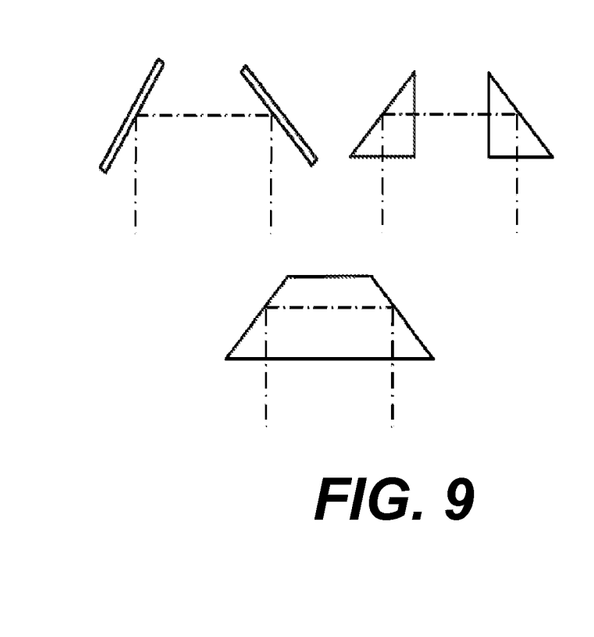
FIG. 9 shows some examples of an optical folding or turning part that includes a triangle prism, a pair of mirrors, two 45° prisms and a single prism.

Other than the triangle prism 802, some others exemplary beam folding components are shown in FIG. 9, they are a pair of mirrors, two 45° prisms and a single prism. With two parts and active alignment, it is generally easier to get good parallelism of folding beam.

Figure 10:
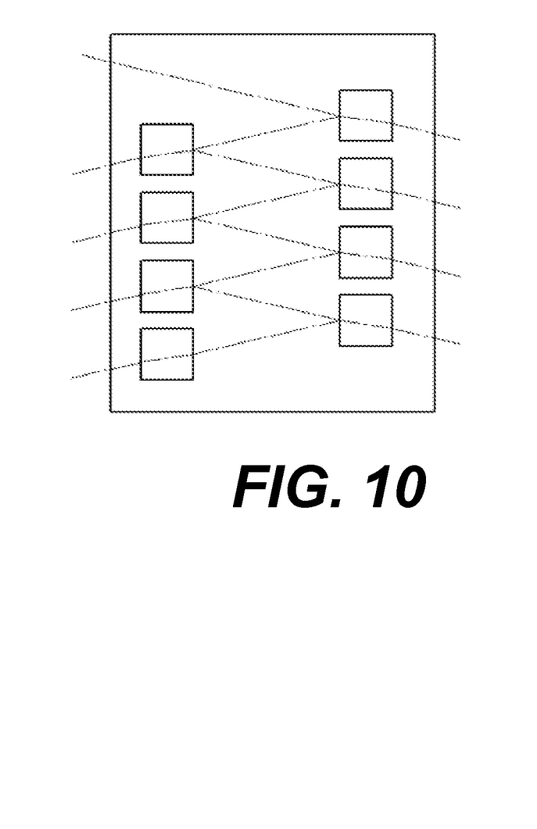
FIG. 10 shows another design that includes eight filters only and has no mirrors.

In the optical Mux/Demux with two layers, the filters and mirrors are located on two sides, which increases the height of the device substantially and also may create a challenge to fit it into the form factor due to the super sensitive locations of the mirrors and filters. To solve this issue, FIG. 10 shows another design that includes eight filters only and has no mirrors. The eight channels are located on the two sides with 4 channels in each side. By using this layout, the width can be decreased without increasing the height.

Figure 11:
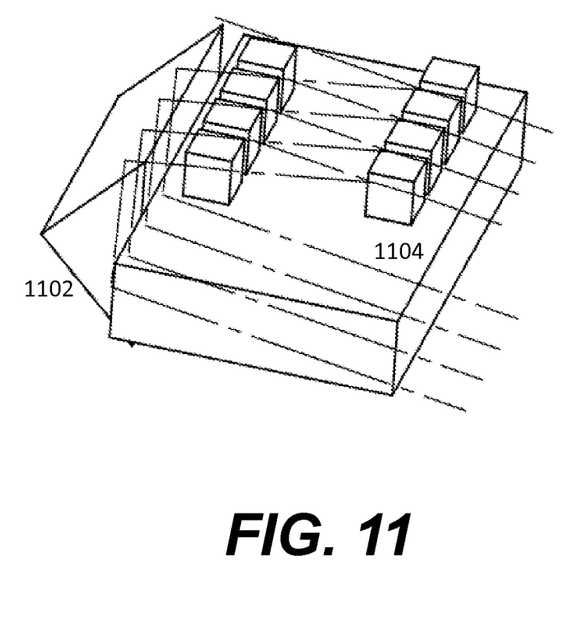
FIG. 11 shows a prism being attached to one end of a substrate to fold 4 channels on the left to the right side.
Figure 12:
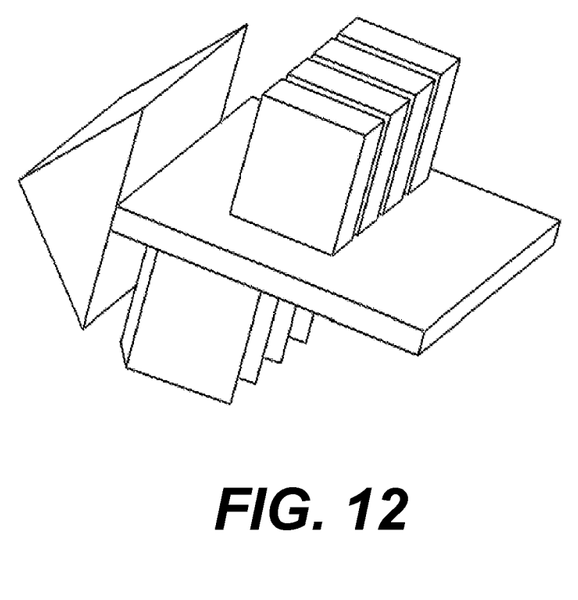
FIG. 12 shows another way by placing four left filters on the second side of the substrate.

In some application, it is needed all the 8 channels placed on one side. To meet this requirement, FIG. 11 shows a prism 1101 being attached to one side of the substrate 1104 to fold the 4 channels on the left to the right side. It leaves enough space for the photodiodes (PD) or LD to be located on one single side, and easier for the PCB layout thereof. Another way to achieve this is to place the left 4 filters on the second side of the substrate as shown in FIG. 12. In this design, 4 filters are located on each side.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A WDM optical device comprising:
   an enclosure shaped in accordance with a standard;
   a port to receive a light beam;
   a substrate with a first side and a second side;
   an optical turning part disposed on one end of the substrate;
   a printed circuit board, disposed on another end of the substrate, including a plurality of light-conversion devices, wherein the port, the substrate, the optical turning part and the printed circuit board are all enclosed in the enclosure, and the printed circuit board includes circuitry to receive an electronic signal from outside of the enclosure and convert the electronic signal to the light beam;
   a first row of optical filters and a second row of optical filters, both rows disposed in parallel on the first side of the substrate, wherein the light beam carrying N signals respectively at wavelengths $\lambda_1, \lambda_2, \ldots \lambda_N$ from the port impinges upon a first one of the optical filters in the first row, N is at least 8, the first one of the optical filters in the first row transmits through a first signal at a first wavelength $\lambda_1$ and reflects the light beam carrying other wavelengths onto a first one of the second row of optical filters, the first one of the second row of optical filters transmits through a second signal at a second wavelength $\lambda_2$ and reflects the light beam carrying other wavelengths onto a second one of the first row of optical filter,
   wherein the first signal is coupled out via one of the light-conversion devices on the printed circuit board, and the second signal is turned by the optical turning part to the second side of the substrate and coupled out via another one of the light-conversion devices on the printed circuit board.

2. The WDM optical device as recited in claim 1, wherein the WDM optical device is packaged in a form factor in compliance with an industry standard.

3. The WDM optical device as recited in claim 2, wherein the industry standard is related to a form factor of a transceiver.

4. The WDM optical device as recited in claim 3, wherein the transceiver is in a form factor of QSFP, QSFP28, CXP, XFP, CFP, CFP-2, or CFP-4.

5. The WDM optical device as recited in claim 2, wherein the optical turning part is a prism.

6. The WDM optical device as recited in claim 2, wherein the optical turning part is a pair of mirrors.

7. The WDM optical device as recited in claim 2, wherein the optical turning part is a pair of prisms.

8. The WDM optical device as recited in claim 1, wherein the first row of optical filters and the second row of optical filters are aligned in such a way that a reflected light beam from one of the optical filters in the first row impinges directly onto one of the optical filters in the second row.

9. The WDM optical device as recited in claim 1, wherein the optical filters in the first row and the second row transmit corresponding designated signals through in opposite directions.

10. The WDM optical device as recited in claim 9, wherein the optical turning part causes the designated signals in opposite directions to be aligned in one direction and read out by the light-conversion devices on the printed circuit board.

11. A WDM optical device comprising:
    an enclosure;
    a common port to receive a light beam;
    a substrate with an upper side and a lower side;
    eight ports disposed on one end of the substrate;

an optical turning part disposed on another end of the substrate;

a printed circuit board, disposed on another end of the substrate, including a plurality of light-conversion devices, wherein the common port, the substrate, the optical turning part and the printed circuit board are all enclosed in the enclosure, and the printed circuit board includes circuitry to receive an electronic signal from outside of the enclosure and convert the electronic signal to the light beam four optical filters in a first row disposed on the upper side of the substrate;

four optical filters in a second row disposed on the upper side of the substrate, and wherein the light beam carrying eight signals respectively at wavelengths $\lambda_1, \lambda_2, \ldots \lambda_8$ from the port impinges upon a first one of the four optical filters in the first row, the first one of the four optical filters in the first row transmits through a first signal at a first wavelength $\lambda_1$ and reflects the light beam carrying other wavelengths onto the optical turning part that turns the reflected light beam to a first one of the four optical filters in the second row, the first one of the four optical filters in the second row transmits through a second signal at a second wavelength $\lambda_2$ and reflects the light beam carrying other wavelengths onto a second one of the four optical filters in the first row via the optical turning part;

wherein the first and second signals are coupled out via two of the light-conversion devices to respective two of the eight ports.

12. The WDM optical device as recited in claim 11, wherein the WDM optical device is packaged in a form factor in compliance with an industry standard.

13. The WDM optical device as recited in claim 12, wherein the industry standard is related to a form factor of a transceiver commonly used in data communication.

* * * * *